(12) United States Patent
Leung

(10) Patent No.: US 7,139,349 B2
(45) Date of Patent: Nov. 21, 2006

(54) SPHERICAL NEUTRON GENERATOR

(75) Inventor: Ka-Ngo Leung, Hercules, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/100,955

(22) Filed: Mar. 18, 2002

(65) Prior Publication Data
US 2002/0131542 A1 Sep. 19, 2002

Related U.S. Application Data

(60) Provisional application No. 60/276,670, filed on Mar. 16, 2001.

(51) Int. Cl.
*G21B 1/00* (2006.01)
(52) U.S. Cl. ................... 376/108; 376/105; 376/100; 310/11
(58) Field of Classification Search .......... 376/108, 376/107, 144, 149, 121, 123, 124, 114, 116, 376/117, 119, 152, 916, 103, 104, 105, 106, 376/100, 151; 310/11
See application file for complete search history.

(56) References Cited

U.S. PATENT DOCUMENTS

| | | | | |
|---|---|---|---|---|
| 2,769,096 A | * | 10/1956 | Frey, Jr. ............... | 250/269.1 |
| 2,983,834 A | * | 5/1961 | Reiffel ............... | 313/568 |
| 3,015,032 A | * | 12/1961 | Hoyer et al. ........... | 376/111 |
| 3,113,213 A | * | 12/1963 | Brinkerhoff et al. ..... | 376/114 |
| 3,258,402 A | * | 6/1966 | Farnsworth ............ | 376/105 |
| 3,417,245 A | * | 12/1968 | Schmidt ............... | 376/109 |
| 3,448,314 A | * | 6/1969 | Bounden et al. ........ | 376/116 |
| 3,609,369 A | * | 9/1971 | Croitoru .............. | 250/398 |
| 4,076,990 A | * | 2/1978 | Hendry et al. ......... | 313/32 |
| 4,290,847 A | * | 9/1981 | Johnson et al. ........ | 376/103 |
| 4,401,618 A | * | 8/1983 | Salisbury ............. | 376/106 |
| 4,568,509 A | * | 2/1986 | Cvijanovich et al. .... | 376/109 |
| 4,654,561 A | * | 3/1987 | Shelton .............. | 315/111.41 |
| 4,853,173 A | * | 8/1989 | Stenbacka ............ | 376/123 |
| 5,162,094 A | * | 11/1992 | Curtis ............... | 376/107 |
| 5,729,580 A | * | 3/1998 | Millspaugh ........... | 376/114 |
| 5,745,536 A | * | 4/1998 | Brainard et al. ...... | 376/114 |
| 5,969,470 A | * | 10/1999 | Druz et al. .......... | 313/359.1 |

OTHER PUBLICATIONS

McTaggart, Plasma Chemistry in Electrical Discharges, Elsevier Publishing Co., 1967, pp. 38-41.*
Merriam-Webster's Colegiate Dictionary, 10th Edition, p. 1131.*

* cited by examiner

*Primary Examiner*—Richard Palabrica
(74) *Attorney, Agent, or Firm*—Lawrence Berkeley National Laboratory; Joseph R. Milner

(57) ABSTRACT

A spherical neutron generator is formed with a small spherical target and a spherical shell RF-driven plasma ion source surrounding the target. A deuterium (or deuterium and tritium) ion plasma is produced by RF excitation in the plasma ion source using an RF antenna. The plasma generation region is a spherical shell between an outer chamber and an inner extraction electrode. A spherical neutron generating target is at the center of the chamber and is biased negatively with respect to the extraction electrode which contains many holes. Ions passing through the holes in the extraction electrode are focused onto the target which produces neutrons by D-D or D-T reactions.

15 Claims, 1 Drawing Sheet

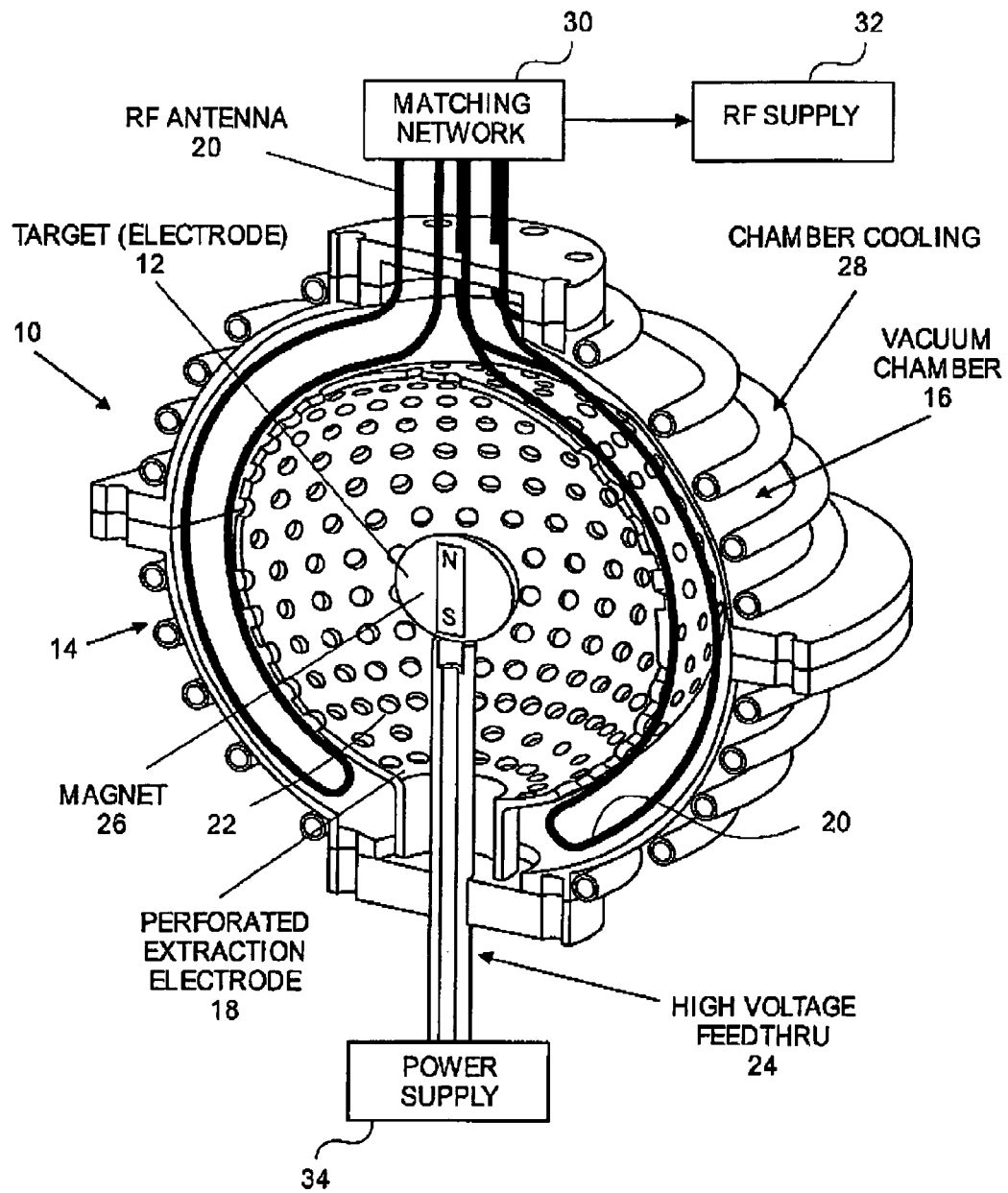

SPHERICAL NEUTRON GENERATOR

RELATED APPLICATIONS

This application claims priority of Provisional Application Ser. No. 60/276,670 filed Mar. 16, 2001.

GOVERNMENT RIGHTS

The United States Government has rights in this invention pursuant to Contract No. DE-AC03-76SF00098 between the United States Department of Energy and the University of California.

BACKGROUND OF THE INVENTION

The invention relates to neutron tubes or sources, and more particularly to neutron tubes or sources based on plasma ion generators, including compact neutron tubes or sources which generate a relatively high neutron flux using the D-D reaction.

Conventional neutron tubes employ a Penning ion source and a single gap extractor. The target is a deuterium or tritium chemical embedded in a molybdenum or tungsten substrate. Neutron yield is limited by the ion source performance and beam size. The production of neutrons is limited by the beam current and power deposition on the target. In the conventional neutron tube, the extraction aperture and the target are limited to small areas, and so is the neutron output flux.

Commercial neutron tubes have used the impact of deuterium on tritium (D-T) for neutron production. The deuterium-on-deuterium (D-D) reaction, with a cross section for production a hundred times lower, has not been able to provide the necessary neutron flux. It would be highly desirable and advantageous to make high flux D-D neutron sources feasible. This will greatly increase the lifetime of the neutron generator, which is unsatisfactory at present. For field applications, it would greatly reduce transport and operational safety concerns. For applications such as mine detection, where thermal neutrons are presently used, the use of the lower energy D-D neutrons (2.45 MeV rather than 14.1 MeV) also would decrease the size of the neutron moderator.

High brightness or point neutron sources, i.e. sources in which the neutrons appear to be coming from a point source, are needed in radiography applications. To make a bright neutron source, the target dimensions must be small and the ion current impinging on the target must be high. In conventional neutron generators, the ion source can produce only low current density with low atomic deuterium ion species. Also, since the target dimensions of conventional sources are large, the neutron beam must be collimated to project back to a point source area. Therefore, a neutron source based on D-D reactions which has a high ion current impinging on a small target would be highly advantageous.

Applications of a high brightness neutron source include neutron radiography; non-proliferation; mine detection; boron neutron capture therapy (BNCT); and material studies. A neutron generator design with a small target area and a high ion current incident on the target would be highly advantageous.

SUMMARY OF THE INVENTION

The invention is a spherical neutron generator formed with a small spherical target and a spherical shell RF-driven plasma ion source surrounding the target. A deuterium (or deuterium and tritium) ion plasma is produced by RF excitation in a plasma ion generator using an RF antenna. The plasma generation region is a spherical shell between an outer chamber and an inner extraction electrode. A spherical neutron generating target is at the center of the ion generator and is separated therefrom by an extraction electrode which contains many holes. The target is a spherical ball of titanium which is biased negatively with respect to the extraction electrode. Ions passing through the holes in the extraction electrode are focused onto the target which produces neutrons by D-D or D-T reactions. The target is loaded with D or T by the impinging ion beam.

This invention provides a high brightness neutron generator with a small target area and a high total ion current on the target, which thereby functions as a point neutron source. Because of the high ion current on the target area, the much safer D-D reaction can be used, eliminating any tritium from the source.

BRIEF DESCRIPTION OF THE DRAWINGS

The FIGURE is a perspective view, partly in section, of a spherical neutron generator of the invention.

DETAILED DESCRIPTION OF THE INVENTION

The FIGURE shows a spherical neutron generator 10 of the invention, which has a small spherical neutron generating target (electrode) 12 inside a spherical shell plasma ion source 14. Neutron generator 10 has a spherical target 12 at its center, surrounded by plasma ion source 14. Plasma ion source 14 is formed in the spherical shell defined between outer vacuum chamber 16 and inner perforated extraction electrode 18.

The principles of plasma ion sources are well known in the art. Preferably, ion source 14 is a magnetic cusp plasma ion source. Permanent magnets are arranged in a spaced apart relationship, on the outer surface of plasma ion generator 14, to from a magnetic cusp plasma ion source. The principles of magnetic cusp plasma ion sources are well known in the art. Conventional multicusp ion sources are illustrated by U.S. Pat. Nos. 4,793,961; 4,447,732; 5,198,677; 6,094,012, which are herein incorporated by reference.

Ion source 14 includes at least one RF antenna (induction coil) 20 for producing an ion plasma from a gas which is introduced into ion source 14. The antenna(s) 20 are connected through a matching network 30 to an RF power supply 32. Preferably in the spherical shell there will be four RF antennas, one in each quadrant of the shell. For neutron generation the plasma is preferably a deuterium ion plasma but may also be a deuterium and tritium plasma.

Ion source 14 also includes a spherically shaped extraction electrode 18 at its inner surface. Electrode 18 electrostatically controls the passage of ions from the plasma out of ion source 14. Electrode 18 contains many holes 22 on its circumference so that ions can be extracted from ion source 14 in many beamlets in all directions from the surface.

Inside the surrounding ion source 14 is spherical target 12. Target 12 is the neutron generating element. Ions from plasma source 14 pass through holes 22 in electrode 18 and impinge on target 12, typically with energy of 120 keV to 150 keV, producing neutrons as the result of ion induced reactions. The target 12 is loaded with D (or D/T) atoms by the beam. Titanium is not required, but is preferred for target 12 since it improves the absorption of these atoms. Target 12 may have a titanium surface and may be a titanium sphere or a titanium coated copper sphere.

In operation, target 12 is biased negatively, e.g. −120 kV, with respect to the extraction electrode 18, which is at ground potential. The bias voltage, from power supply 34, is applied to target 12 by high voltage feedthrough 24 which passes through ion source 14. Because of the spherical geometry, the equipotential surfaces between extraction electrode 18 and target 12 will also be spherical in shape and the electric field generated will focus the ions onto the target 12. A magnet 26 inside target 12 is used to suppress the secondary emission electrons generated on the target surface.

Ion source 14 can generate a dense plasma with current density as high as about 1 A/cm$^2$. Chamber cooling coils 28 may surround the chamber 16. The resulting neutron flux may reach $10^{16}$ n/s. Because of the high ion current, sufficient neutron flux can be generated from D-D reactions in this neutron generator, as well as by D-T reactions used in a conventional neutron tube, eliminating the need for radioactive tritium. The neutrons produced, 2.45 MeV for D-D or 14.1 MeV for D-T, will also go out radially from neutron generator 10 in all directions. Because of the small target size, neutron generator 10 acts as a point neutron source.

The high brightness spherical neutron generator of the invention may be used for a wide variety of applications that require a point neutron source, including but not limited to neutron radiography; non-proliferation; mine detection; boron neutron capture therapy (BNCT); and material studies.

Changes and modifications in the specifically described embodiments can be carried out without departing from the scope of the invention which is intended to be limited only by the scope of the appended claims.

The invention claimed is:

1. A spherical neutron generator, comprising:
   a spherical solid target formed of a material that is disposed to capture ions impinging an outer surface of the target and,
   a spherical shell RF-driven plasma ion source means for surrounding the target and for producing ions that are directed toward and impinge on the outer surface of the target to load the target with captured ions; and further the plasma ion source means for producing other ions that impact the ions previously loaded on the target to react with the loaded ions to produce neutrons without thermonuclear fusion reactions.

2. The spherical neutron generator of claim 1 wherein the plasma ion source means comprises:
   a spherical shell shaped plasma generation region; and
   a spherically shaped ion extraction electrode inside the plasma generation region.

3. The spherical neutron generator of claim 2 further comprising:
   at least one RF antenna disposed within the plasma generation region.

4. The spherical neutron generator of claim 3 further comprising:
   a matching network connected to each RF antenna; and
   a RF power supply connected to the matching network.

5. The spherical neutron generator of claim 3 further comprising:
   four RF antennas disposed within the plasma generating region, one in each quadrant.

6. The spherical neutron generator of claim 2 wherein the extraction electrode contains a plurality of holes.

7. The spherical neutron generator of claim 2 further comprising:
   a power supply connected to the target for biasing the target with respect to the extraction electrode so that ions are extracted from the plasma generation region and impinge on the target.

8. The spherical neutron generator of claim 1 wherein the plasma ion source means is a deuterium ion source or a deuterium and tritium ion source.

9. The spherical neutron generator of claim 1 wherein the plasma ion source means is a multicusp plasma ion source means.

10. The spherical neutron generator of claim 1 wherein the target has a titanium surface.

11. The spherical neutron generator of claim 10 wherein the target is a titanium sphere or a titanium coated copper sphere.

12. The spherical neutron generator of claim 1 further comprising a magnet inside the target to suppress secondary emission electrons generated on the target surface.

13. The spherical neutron generator of claim 1 further comprising an external vacuum chamber surrounding the plasma ion source means.

14. The spherical neutron generator of claim 1 wherein the plasma ion source means generates a plasma with current density as high as about 1 A/cm$^2$.

15. The spherical neutron generator of claim 1 wherein the resulting neutron flux is up to $10^{16}$ n/s.

* * * * *